United States Patent [19]

Gahlau et al.

[11] Patent Number: 4,655,496

[45] Date of Patent: Apr. 7, 1987

[54] MOTOR VEHICLE NOISE INSULATION

[75] Inventors: Heinemann Gahlau, Celle; Klaus Wittenmayer, Uetze; Manfred Laubner, Florsheim/Wicker; Herbert Baumeister, Hochheim, all of Fed. Rep. of Germany

[73] Assignee: Dr. Alois Stankiewica GmbH, Adelheidsdorf, Fed. Rep. of Germany

[21] Appl. No.: 794,734

[22] Filed: Nov. 4, 1985

[30] Foreign Application Priority Data

Nov. 7, 1984 [DE] Fed. Rep. of Germany ....... 3440701

[51] Int. Cl.⁴ .............................................. B62D 25/08
[52] U.S. Cl. .................................. 296/39 A; 296/194; 181/204; 181/286
[58] Field of Search ................... 296/39 A, 39 R, 194, 296/31 R, 31 P; 181/204, 286, 288

[56] References Cited

U.S. PATENT DOCUMENTS

| 2,166,848 | 7/1939 | Prudden | 296/39 A X |
| 4,228,869 | 10/1980 | Bschorr | 181/286 |
| 4,288,490 | 9/1981 | Alfter et al. | 296/39 A X |
| 4,391,465 | 7/1983 | Piano | 296/194 X |
| 4,456,092 | 6/1984 | Kubozuka et al. | 181/204 X |
| 4,463,049 | 7/1984 | Kracke | 181/286 X |
| 4,479,992 | 10/1984 | Haeseker et al. | 181/288 X |
| 4,584,232 | 4/1986 | Frank et al. | 181/288 |

FOREIGN PATENT DOCUMENTS

| 2403254 | 8/1975 | Fed. Rep. of Germany | 296/39 A |
| 2504712 | 10/1982 | France | 296/39 A |
| 0032512 | 3/1978 | Japan | 296/39 A |

Primary Examiner—Robert B. Reeves
Assistant Examiner—Russell D. Stormer
Attorney, Agent, or Firm—Lewis H. Eslinger

[57] ABSTRACT

A partition (4) for separating the engine compartment (2) from the passenger compartment (3) of a motor vehicle comprises a wall (5) and a covering (6) of noise-insulating material on the engine compartment side of the wall. The partition (4) has convex or concave deformations (8, 9, 11) in one or several areas of the high noise occurrence.

20 Claims, 4 Drawing Figures

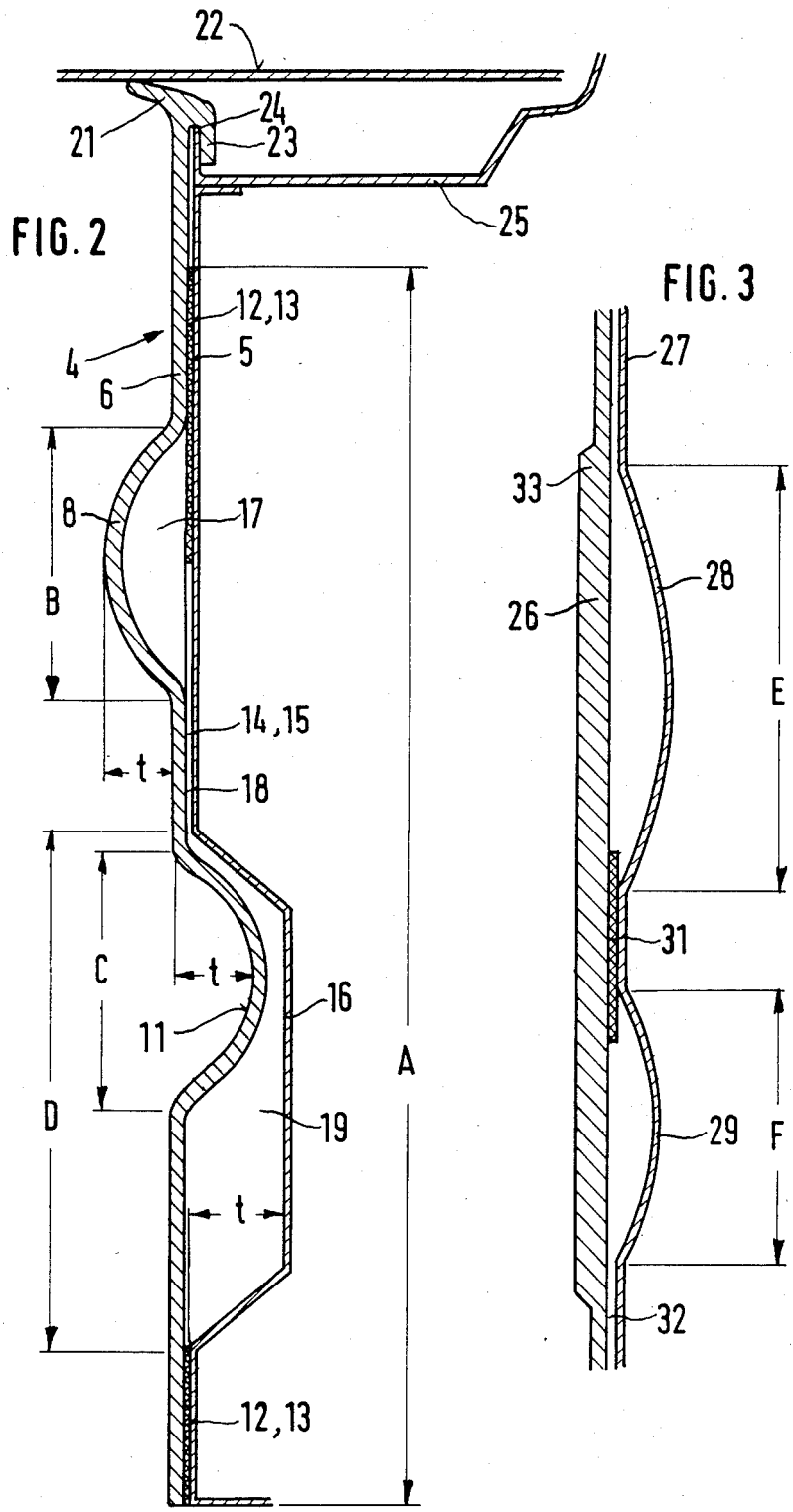

MOTOR VEHICLE NOISE INSULATION

BACKGROUND OF THE INVENTION

This invention relates to motor vehicle noise insulation and is concerned with a noise insulating partition for dividing the engine compartment from the passenger compartment.

A dividing partition of the above type is, apart from other things, exposed frontally to the noise coming from the engine of the motor vehicle and therefore requires acoustic treatment to achieve the desired noise comfort in the passenger compartment. For this purpose it is known to provide such a partition by providing the wall between the engine and passenger compartments with a covering of noise-insulating material on the passenger compartment side. These noise-insulating materials are ones which require a considerable material thickness in order to obtain the noise comfort desired in modern motor vehicles. It has also been known to apply noise-insulating material in the form of an insulation part on the engine compartment side of the wall.

Such known constructions are disadvantageous in two respects. On the one hand the covering for the passenger compartment side of the front wall can only be assembled under complicated conditions so increased production costs are thus involved. Also, it should be borne in mind that the assembly difficulties increase in proportion to an increase in the thickness of the covering. On the other hand, because of the considerable thickness of covering needed for present-day noise comfort, such known constructions lead to a reduction in the size of the passenger compartment which contradicts existing requirements, viz. to create a passenger compartment with as large a volume as possible. Therefore, there is a demand for "slenderised", i.e. comparatively thin coverings.

In Dr. A. Stankiewicz-Information sheet No. 61 "Efficient noise damping in the modern truck drivers cab", on page 5, column 2 there is described and shown a covering for the engine compartment side of the dividing wall of a forward control type (cab over engine) drivers cab for a truck. The wall here is the bottom wall of the forward control type drivers cab. The covering is applied in the form of a noise-insulating material which is used at the same time as underfloor protection.

With this known construction in the main only slight air noise insulation is effected by the application of the insulating material to the engine compartment side so there is still a need to have a covering on the passenger compartment side. Therefore the aforementioned disadvantages are not eliminated.

Common to both the above-described known solutions is the fact that essentially the noise is only counteracted by the mass of the noise-insulating material. Special measures for reducing the amount of material used are not provided.

BRIEF SUMMARY OF THE INVENTION

It is an object of the present invention to produce a partition between the engine and passenger compartments which, when the amount of noise-insulating material is reduced, makes possible at least a reduction in the amount of covering needed on the passenger compartment side and a simplified application of the covering on the engine compartment side.

According to the present invention there is provided a partition, for separating the engine and passenger components of a motor vehicle, comprising a wall between the compartments and a covering of noise-insulating material on the engine compartment side of the wall, the partition including at least one convex or concave deformation.

By means of the construction of the present invention not only is the noise counteracted by the noise-insulating material itself, but also by the special deformations provided in the partition. The deformations should be disposed in one or several areas of high noise occurrence and contribute substantially to the noise insulation, independently of the amount of noise-insulating material present.

Ordinarily, the wall will be formed of sheet metal and the deformation(s) may be located in the wall or in the covering. If desired the deformation(s) may be provided in both the wall and in the covering. If the deformations lead to cantilever areas in the covering, it is recommended that the covering is made of self-supporting, high heat resistant, thermoplastics material. Preferred materials are highly filled elastomer-modified polyamides or polypropylenes or multi-component systems, preferably two component systems, such as polyurethanes which can be processed by the RIM (reaction injection moulding) process which guarantees an acoustically favourable use of space by providing greater distances between the covering and the wall.

The idea underlying the present invention is the specific simultaneous use of different acoustic effect mechanisms and this can also be accomplished by not only the covering but also the front wall being a component of the noise insulation system, as a result of the deformations provided according to the invention. This is possible by providing the wall with otherwise "non-usual deformations". (By "usual deformations" are meant those known deformations which are provided for other reasons e.g. for reinforcement purposes.) The depth of such deformations in the case where the wall is formed of sheet metal is in practice only limited by the deep-drawability of the sheet metal. Although the deformations provided in accordance with the invention are included for acoustic purposes, they nevertheless also lead to desirable reinforcement of both the front wall and the covering.

The use of the partition of the invention does not lead to a reduction in the passenger compartment but rather to an increase thereof because the covering on the engine compartment side is arranged where there is a space between the wall and the engine. An increase in the passenger compartment is thus achieved by means of the partition of the invention because noise-insulation on the passenger compartment side can at least be substantially reduced, e.g. be made in a smaller layer thickness. Therefore the assembly is also considerably simplified because a thinner passenger compartment side covering is easier to handle e.g. easier to fold, for example when using automatic machines. Whether a covering on the passenger compartment side can be dispensed with altogether depends, amongst other things, on the motor vehicle. If increased comfort is desired, a carpet will probably always be laid which, by its very nature, contributes to the noise insulation.

In addition the assembly of the covering on the engine compartment side can be considerably simplified if the covering is in the form of a self-supporting insulation part. Such a covering can be mounted by means of automatic machines, which is normally hardly possible for coverings on the passenger compartment side.

It has been discovered that convex deformations facing the engine are particularly suitable for providing mainly low frequency noise insulation. Acoustically favourable depths of about 60 to 80 mm for such deformations can be easily achieved both in the wall and also in the covering. In contrast to this, concave deformations are suitable in particular for damping or absorbing high freuqencies, e.g. about 1000 Hz. Concave deformations can be made flat and are therefore also suitable at locations with a small free area.

Instead of deformations of this type, receses or stampings-out can also be effected especially in the wall, and with suitable acoustic use these offer further improvements in the entire insulation system. For example a recess in the wall can be provided with an additionally created square-shaped depression in the form of a box which is intended both for receiving the windscreen wiper motor and also for increasing the absorption surface for e.g. low frequencies.

It is recommended, for the sake of economy of material and weight, to dimension the thickness of the covering according to the occurrence of noise, and certainly to make it thicker in areas of high noise occurrence than in areas of low noise occurrence.

In accordance with the present invention it is also possible to arrange the covering as a whole, or in partial areas, to be spaced from the wall so that, in specific areas, mass-spring-systems known per-se can be put into effect which are not only respectively limited to an area of high noise occurrence, but can also overlap several areas of high noise occurrence. In this case, it is preferred for the spacing between the covering and the wall to be greater in areas of higher noise occurrence than in the areas of lower noise occurrence.

An advantageous development of the invention consists in filling one or more of the cavities between the wall and the covering, preferably the cavities in the region of the convex and concave deformations, with loosely structured material, e.g. with foam materials, flakes, compact foams, fibres or similarly loosely structured material, in order to improve still further the high frequency absorption. In principle, however, even the presence of an air gap between the covering and the wall fulfills an acoustic function, and care must be taken that the sealing at the edges is as tight as possible.

By introducing dense masses into the deformations the acoustic impedance is increased as desired. Thus e.g. surfaces of the wall and/or the covering which vibrate greatly can be subdued, i.e. damped.

Before constructing a partition in accordance with the present invention, investigations should first be carried out to determine those areas of the partition which can best be used for air noise insulation, solid-borne noise damping and air noise damping. For this purpose those areas of the partition which have particularly high solid-borne noise acceleration levels or amplitudes are determined, according to known processes or using known calculations according to finite-element methods for the vehicle in its ready-to-move condition or at an early construction phase. At these areas the covering is preferably joined to the wall by an adhesive. Preferably the adhesive used is a solid-borne noise damping adhesive. The material thickness (a few millimetres) is preferably so determined that it gives a firm adhesion with a damping effect. In this way mechanical, solid-borne-noise-conductive securing means can be dispensed with.

Some areas of the wall on the engine compartment side are not very accessible because of units fitted there and hence it is only slightly possible to make acoustically effective use of space. Thus these areas have to be used for air noise insulation based on an increase in mass and therefore the covering in these areas is made to be contour-fitting and to have as large a surface as possible. In this thus formed area the covering is preferably stuck over the whole surface of the wall so that here also additional mechanical mounting means are not necessary.

In modern methods using variable assembly planes, the adhesion can be carried out e.g. by means of highly slide-resistant hot melt adhesives which can be well adapted for large-scale manufacturing processes using the prior art according to known methods. The above-described securing by means of adhesives is particularly suitable in the case of combustion engines wherein the spectrum of the noise generated is composed of low frequency and high frequency parts whereby the noise pressure level in the passenger compartment decreases in level from low to high frequencies. In particular in the case of four cylinder engines, interference is caused by unbalanced mass forces of the second motor order which corresponds with the ignition frequency and leads to the occurrence of humming in the passenger compartment. With other types of engine, or even after the removal of this disturbing humming frequency, there remains the high frequency part which can also be insulated or damped by the present invention.

An advantageous and easy-to-assemble development of the partition of the present invention consists in folding the covering over the upper edge of a water drainage tray. Moreover, the sealing of the partition to the motor hood can be achieved by a sealing lip on the upper edge of the covering. In a further embodiment of the invention provision is made for contact elements, like sealing lips, central plugs, passageways or the like to be integrated into the covering. In this way an easy-to-assemble covering is produced. In particular the injection moulding process is recommended for connecting the contact elements to the covering. Moreover, this process also fits in with the design of the accoustically effective surfaces of the covering.

By means of the injection moulding process, the surface masses of the covering or of the convex and concave deformations therein can also be varied within wide ranges, e.g. between 2 and 20 kgm$^{-2}$, so that account can be taken of the different acoustic requirements of different types of motor vehicles. Also by means of the injection moulding technique, an acoustically necessary surface-limited mass distribution is possible without additional operations being necessary.

The partition of the present invention makes it possible to combine different acoustic systems, e.g. insulation, damping and absorption and thus at the same time to distribute them over the wall surface to be insulated. There is thus produced a covering which, as regards its total acoustic effect, far exceeds what has been known from the prior art. By means of the surface-limited convex and concave deformations in accordance with the present invention, stepless, acoustic adjustments of the individual partial systems can be carried out.

BRIEF DESCRIPTION OF THE SEVERAL VIEWS OF THE DRAWINGS

For a better understanding of the present invention and to show how the same may be carried into effect, reference will now be made, by way of example, to the accompanying drawings, in which FIG. 2 is a section along the line II—II of the partition of FIG. 1;

FIG. 3 is similar to FIG. 2 but illustrates a second embodiment of the invention.

DETAILED DESCRIPTION

Figure 1:
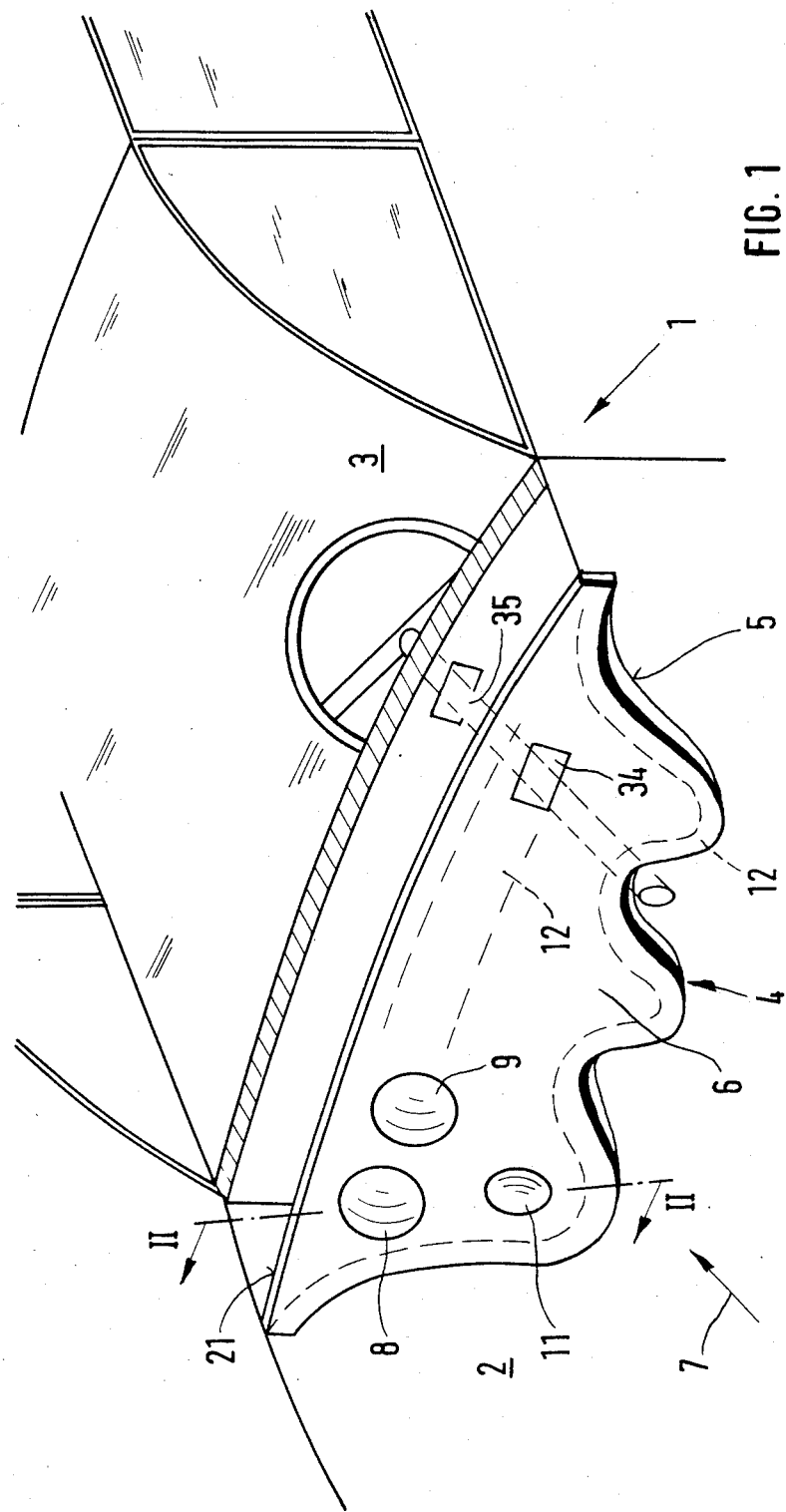
FIG. 1 shows a perspective view of part of a motor vehicle including a partition constructed according to the present invention.

In FIG. 1 there is shown a motor vehicle 1 having an engine compartment 2 and a passenger compartment 3. A partition 4 extends upwardly between compartments 2 and 3 and its circumferential contours follow the body of the motor vehicle 1. The partition 4 comprises a sheet metal front wall 5 and a plastics covering 6 on the engine compartment side of the wall 5. The noise emanating from the engine (not shown) is indicated by an arrow 7.

According to FIG. 1 the covering 6 has three deformations which deviate from its central plane, viz. two convex deformations 8 and 9 facing the engine, and one concave deformation 11 turned away from the engine. The deformations 8, 9 and 11 are arranged in areas of high noise occurrence and, apart from the noise-insulating effect of the covering 6, they also contribute to the noise-damping and absorption.

In the areas referenced 12 and indicated by broken lines the covering 6 is stuck surface-wise to the front wall 5. The adhesive is referenced, in FIG. 2, by numeral 13. It is a solid-borne noise damping, i.e. resilient, adhesive 13, which forms a mass-spring-system with the covering 6 of the front wall 5, the system being referenced A in FIG. 2. At the point referenced 14 in FIG. 2 there is no adhesive but a clearance 15 between the covering 6 and the front wall 5. Such a clearance 15 also leads to a mass-spring-system and could, for example, also be disposed at other points between the covering 6 and the front wall 5 or also at the locations of the adhesive 13 itself if alternative arrangements were made for securing the covering 6 e.g. by means of resilient securing elements.

Because of their depths t, which can be for example 60 to 80 mm, the deformations 8, 9 and 11 form mass-spring-systems B and C which have smaller surfaces. A further integrated mass-spring-system D is formed by a concave deformation 16 of the front wall 5 into which extends the concave deformation 11.

At least the cavities 17 and 19 caused by the deformations 8, 9, 11 and 16 and optionally also the cavity 18 caused by the clearance 15 are filled with a loosely structured material, e.g. foam, flakes, compound foam, fibres or the like.

As can best be seen from FIG. 2, the covering 6 includes, on its upper edge, a sealing lip 21 which cooperates tightly with the engine hood 22.

The covering 6 also has on its upper edge a rear lip 23 that is curved downwardly and folded over the upper edge 24 of a front water drainage tray 25 and engages behind the tray 25. This produces a retaining means for the covering 6 which is useful especially during the sticking stage.

The second embodiment of the partition according to the present invention shown in FIG. 3 differs from the first embodiment described above in that the covering, here denoted by reference numeral 26, extends in a straight line and the front wall, here denoted by reference numeral 27, has two concave deformations 28 and 29. In the area between the deformations 28 and 29, the front wall 27 and the covering 26 are stuck together, preferably by means of a resilient adhesive 31. The deformations 28 and 29 are relatively flat and respectively form mass-spring-systems E and F, which are integrated into a mass-spring system of larger surface area which exists between the covering 26 and the front wall 27 because of the clearances 32. The deformations 28 and 29 are located in an area of high noise occurrence.

A further difference with respect to the first embodiment is the fact that the covering 26 is thickened in the area of high noise occurrence, see reference numeral 33.

The convex deformations 8 and 9 are located in areas of mainly low frequency noise contents, whilst the concave deformations 11, 16, 28 and 29 are arranged in areas of high frequency noise contents.

The circumferential- or cross section form of the deformations 8, 9, 11, 16, 28 and 29 can be different. It is recommended, for reasons of corrosion resistance, to provide apertures (not shown), in the area of the deformations to allow the aeration and ventilation of the enclosed cavity between the covering 6 and 26 and the front wall 5 and 27. The acoustic effectiveness is not noticeably influenced by this since the known energy-extracting, air noise-absorbing effect of a Helmholtz resonator occurs.

The invention is not limited to the above-described embodiments. Within the scope of the invention it is, for example possible to provide the covering as a layer on the front wall which follows deformations in the front wall and which is adhered to the front wall over its whole surface. It is also possible to provide convex deformations only in the front wall and to use a covering in the form of a flat component, for example, adhered at specific points to the front wall. It is also possible to provide deformations in the area of the thickened covering 26.

As adhesive 13, 31 there is preferably used a hot melt adhesive which is resilient to the set state.

The coverings 6 and 26 are preferably produced by the injection moulding process. This process makes possible, in a simple and cheap way, the integration of contact elements, like the sealing lip 21, central plugs (not shown) tachometer shaft passageways (not shown) and, for example, a passageway 34 for a connecting rod 35. An integrated covering of this type is advantageous from the assembly point of view and it also requires no special mounting of the contact elements integrated in it.

Figure 4:
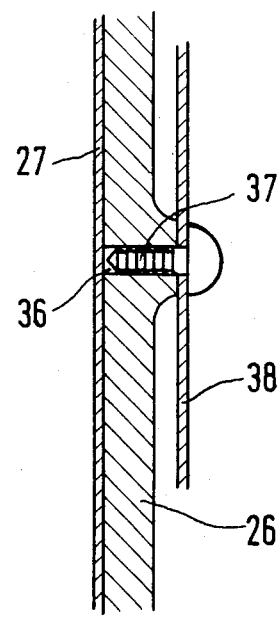
FIG. 4 is a section through a part of a partition in accordance with a further embodiment of the invention.

In accordance with the embodiment of FIG. 4 the covering 26 is provided with preferably cylindrical apertures 36 for receiving a securing means 37, e.g. straddling dowels, with the aid of which for example a mat 38 can be secured.

We claim:

1. A partition for separating an engine compartment subject to low-frequency and high-frequency noise and a passenger compartment of a motor vehicle, which partition comprises (i) a sheet metal wall located between the compartments so as to have one side adjacent the engine compartment and (ii) a covering of noise-insulating material on the side of the wall adjacent the engine compartment, the partition including at areas of high noise levels a convex deformation at an area of low-frequency noise and a concave deformation at an area of high-frequency noise, said wall and said covering being in spaced-apart relationship at said deformations.

2. A partition as claimed in claim 1 wherein at least one of said deformations is provided in the wall.

3. A partition as claimed in claim 1 wherein at least one of said deformations is provided in the covering of noise-insulating material.

4. A partition as claimed in claim 1 wherein the covering is in the form of a self-supporting, heat-resistant, thermoplastics material.

5. A partition as claimed in claim 4 wherein the thermoplastics material is a highly filled elastomer-modified polyamide.

6. A partition as claimed in claim 4 wherein the thermoplastics material is a polypropylene.

7. A partition as claimed in claim 4 wherein the thermoplastics material is a multi-component system.

8. A partition as claimed in claim 7 wherein the multi-component system is a polyurethane system.

9. A partition as claimed in claim 8 wherein the covering is formed of a polyurethane processed by the RIM process.

10. A partition as claimed in claim 1 wherein the covering of noise-insulation material is at least partially spaced from the wall.

11. A partition as claimed in claim 1 wherein, along the partition, oppositely-lying deformations are provided opposite to each other.

12. A partition as claimed in claim 1 wherein, transversely of the partition, convex and concave deformations are disposed adjacently to each other.

13. A partition as claimed in claim 1 wherein one or more cavities formed between the wall and the covering are filled with loosely structured material at least in the area of the deformations.

14. A partition as claimed in claim 1 wherein the covering is adhered to the wall.

15. A partition as claimed in claim 14, wherein the adhesive used is a solid-borne noise damping adhesive.

16. A partition as claimed in claim 1 wherein the covering has a lip at its upper edge which is folded over a water drainage tray.

17. A partition as claimed in claim 1 wherein the vehicle has an engine hood, the covering has an edge facing the engine hood, and a sealing lip is provided at least on said edge for abutting against the hood.

18. A partition as claimed in claim 1 wherein contact elements are integrally formed in the covering.

19. A partition as claimed in claim 1 wherein the covering is produced by an injection moulding process and further comprising integrated contact elements embedded in the covering during the injection moulding process.

20. A partition as claimed in claim 1 wherein the covering is provided with apertures for receiving securing means.

* * * * *